US000001846H

United States Statutory Invention Registration [19]

[11] Reg. Number: H1,846

Poorman

[45] Published: Apr. 4, 2000

[54] ELECTRO-HYDRAULIC STEERING SYSTEM FOR AN ARTICULATED VEHICLE

[75] Inventor: Bryan G. Poorman, Princeton, Ill.

[73] Assignee: Caterpillar Inc., Peoria, Ill.

[21] Appl. No.: 09/241,707

[22] Filed: Feb. 2, 1999

[51] Int. Cl.[7] ..... B62D 5/06

[52] U.S. Cl. ..... 180/418

[56] References Cited

U.S. PATENT DOCUMENTS

| | | | |
|---|---|---|---|
| 4,949,265 | 8/1990 | Eguchi et al. | 364/424.05 |
| 5,003,480 | 3/1991 | Mori et al. | 364/424.05 |
| 5,029,660 | 7/1991 | Raad et al. | 180/143 |
| 5,180,026 | 1/1993 | Mori | 180/140 |
| 5,317,513 | 5/1994 | Mouri | 364/424.05 |
| 5,430,650 | 7/1995 | Susuki et al. | 364/424.05 |
| 5,448,481 | 9/1995 | Asanuma et al. | 364/424.05 |
| 5,576,956 | 11/1996 | Ashizawa et al. | 364/424.05 |
| 5,596,498 | 1/1997 | Thomsen | 364/424.05 |
| 5,717,590 | 2/1998 | Mihalko | 364/424.05 |
| 5,732,372 | 3/1998 | Marsden | 701/41 |
| 5,743,351 | 4/1998 | McLaughlin | 180/446 |
| 5,761,627 | 6/1998 | Seidel et al. | 70/41 |
| 5,788,010 | 8/1998 | Mukai et al. | 180/446 |

*Primary Examiner*—Harold J. Tudor
*Attorney, Agent, or Firm*—Kevin M. Kercher

[57] ABSTRACT

The present invention provides an electro-hydraulic steering system for an articulated vehicle having a front frame and a rear frame. The system includes a controller and a hydraulic steering system having a pump for providing hydraulic pressure. A steering input control, typically a steering wheel, transmits mechanical steering inputs to the hydraulic steering system. A pair of articulation cylinders rotate the front frame with respect to the rear frame in response to hydraulic pressure to steer the vehicle. Position sensors transmit input signals to the controller indicating the position of the steering input control and each of the articulation cylinders. An electro-hydraulic valve receives electrical control signals from the controller to control the hydraulic pressure to each articulation cylinder. In this manner, the present invention can perform steering performance enhancements, such as snubbing, steering jerk limit control, and electronic steering adjustment.

24 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRO-HYDRAULIC STEERING SYSTEM FOR AN ARTICULATED VEHICLE

TECHNICAL FIELD

The present invention relates generally to an electro-hydraulic steering system for an articulated vehicle.

BACKGROUND ART

An articulated vehicle is a vehicle having a front frame member, a rear frame member, and an articulation joint connecting the front and rear frame members. Typically, to steer an articulated vehicle right or left, the front frame member must be rotated relative to the longitudinal axis of the rear frame member about the articulation joint.

To rotate the front frame member, these vehicles commonly include articulation cylinders mounted to the rear frame member. The articulation cylinders are operated in opposite directions. That is, when one cylinder is extended forward, the other cylinder is retracted rearward and vice versa. Typically, the articulation cylinders are hydraulically controlled by a steering system commonly known as a hand metering steering unit or HMU.

Although prior art HMUs provide adequate steering control, they have several shortcomings. Foremost, hand metering steering units can not perform certain steering performance enhancements, such as snubbing, steering jerk limit control, and electronic steering adjustment. Snubbing is defined as the softening of the end of cylinder impact. Thus, it is desirable to provide an electro-hydraulic steering system for an articulated vehicle which overcomes the shortcomings of the prior art.

DISCLOSURE OF THE INVENTION

The present invention provides an electro-hydraulic steering system for an articulated vehicle having a front frame and a rear frame. The system includes a controller and a hydraulic steering system having a pump for providing hydraulic pressure. A steering input control, typically a steering wheel, transmits mechanical steering inputs to the hydraulic steering system. A pair of articulation cylinders rotate the front frame with respect to the rear frame in response to hydraulic pressure to steer the vehicle. Position sensors transmit input signals to the controller indicating the position of the steering input control and each of the articulation cylinders. An electro-hydraulic valve receives electrical control signals from the controller to control the hydraulic pressure to each articulation cylinder. In this manner, the present invention can perform steering performance enhancements, such as snubbing, steering jerk limit control, and electronic steering adjustment.

BEST MODE FOR CARRYING OUT THE INVENTION

Figure 1:
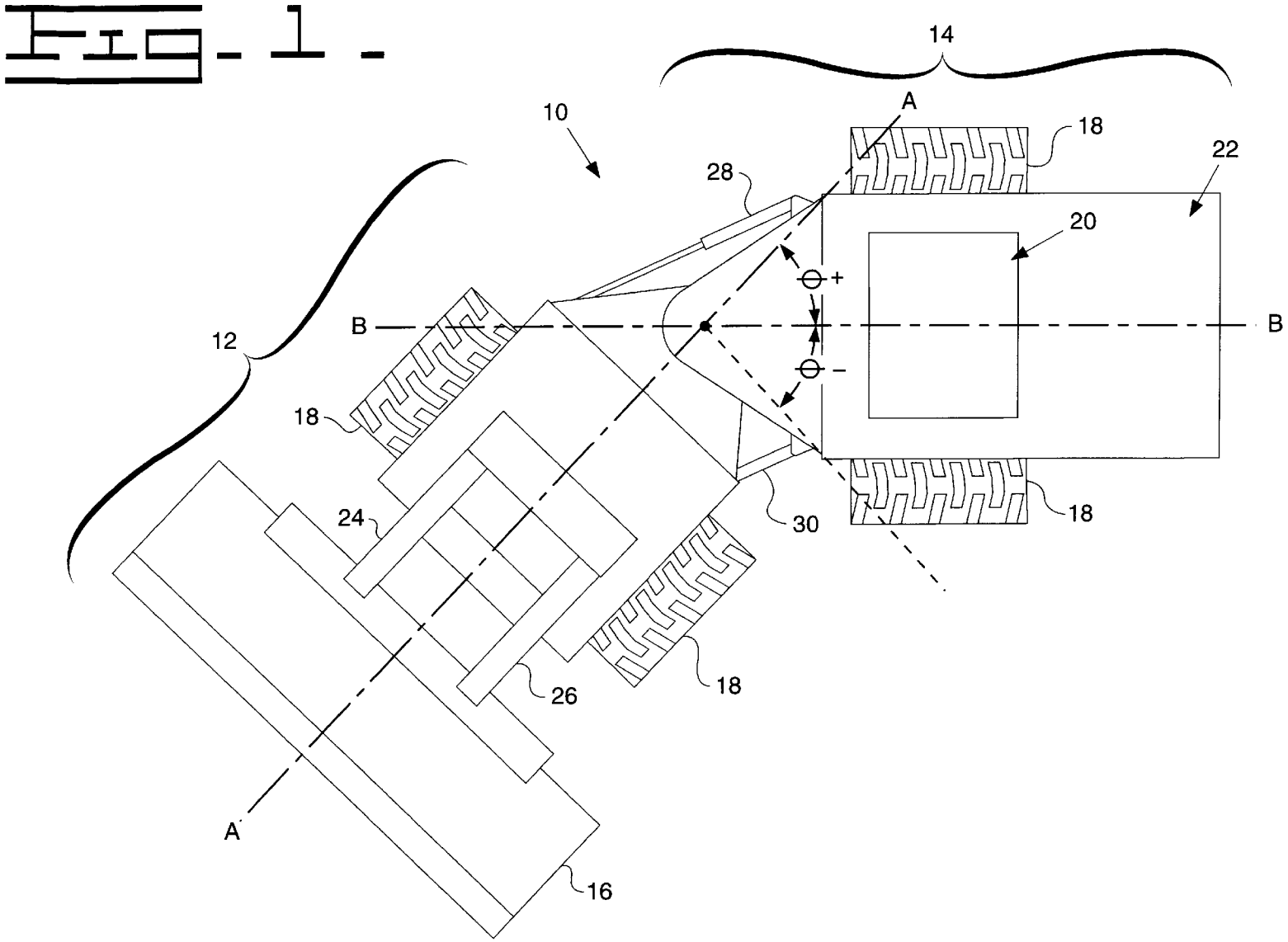
FIG. 1 is a schematic top view of a wheel loader.

Referring to the Figures, wherein like numerals indicate like or corresponding parts throughout the several views, a schematic top view of a wheel loader 10 is shown in FIG. 1. The wheel loader 10, also referred to as a front loader, is used primarily to scoop, lift, and move large quantities of material, such as earth. Although a wheel loader is illustrated in FIG. 1, one of ordinary skill in the art will recognize that the present invention may be used on any vehicle having an articulated steering system, such as for example, a scraper motor grader etc. In other words, the present invention may be used on any vehicle which must be articulated to turn. Accordingly, the wheel loader 10 is illustrated in FIG. 1 for example purposes only and is not intended to limit the scope of the present invention.

The wheel loader 10 includes a front frame 12, a rear frame 14, and a bucket 16. The front and rear frames 12 and 14 are supported by tires 18. An operator cab, shown generally at 20, contains the many controls necessary to operate the wheel loader 10. The operator cab 20 is typically mounted on the rear frame 14. An engine, shown generally at 22, is used to drive or power the wheel loader 10. The engine 22 is mounted on the rear frame 14. The bucket 16 is used to scoop and lift material. The bucket 16 is mounted to the front frame 12 with a pair of lift arms 24 and 26. The lift arms 24 and 26 are hydraulically controlled to lift and tilt the bucket 16.

As will be readily understood by one of ordinary skill in the art a right articulation cylinder, located generally at 28, is mounted to the right side of the rear frame 14 and a left articulation cylinder, located generally at 30, is mounted to the left side of the rear frame 14. The right and left articulation cylinders 28 and 30 are used to rotate the front frame 12 about an articulation joint 32. The articulation joint 32 connects the front frame 12 and the rear frame 14. To rotate the front frame 12 to the right, the right articulation cylinder 28 is retracted rearward and the left articulation cylinder 30 is extended forward. To rotate the front frame 12 to the left, the right articulation cylinder 28 is extended forward and the left articulation cylinder 30 is retracted rearward. Each articulation cylinder 28 and 30 has a range of movement between an extended end position and a retracted end position.

In FIG. 1, the front frame 12 of the wheel loader 10 is shown rotated to a full left articulation angle $+\theta$. The articulation angle $\theta$ is formed by the intersection of the longitudinal axis A of the front frame 12 and the longitudinal axis B of the rear frame 14. Each articulation cylinder 28 and 30 includes a position sensor for indicating the extended or retracted position of the cylinder. With this information, the articulation angle $\theta$ may be calculated. Alternatively, a rotary sensor may be positioned at the articulation joint 32 to measure the articulation angle $\theta$. A full right articulation angle $-\theta$, shown in phantom lines in FIG. 1, is a mirror image of the full left articulation angle $+\theta$. The wheel loader 10 may be operated with the front frame 12 rotated to the full left articulation angle $+\theta$, the full right articulation angle $-\theta$, or any angle therebetween. To steer the wheel loader 10 left, the front frame 12 is rotated to a left articulation angle. To steer the wheel loader 10 right, the front frame 12 is rotated to a right articulation angle.

Figure 2:
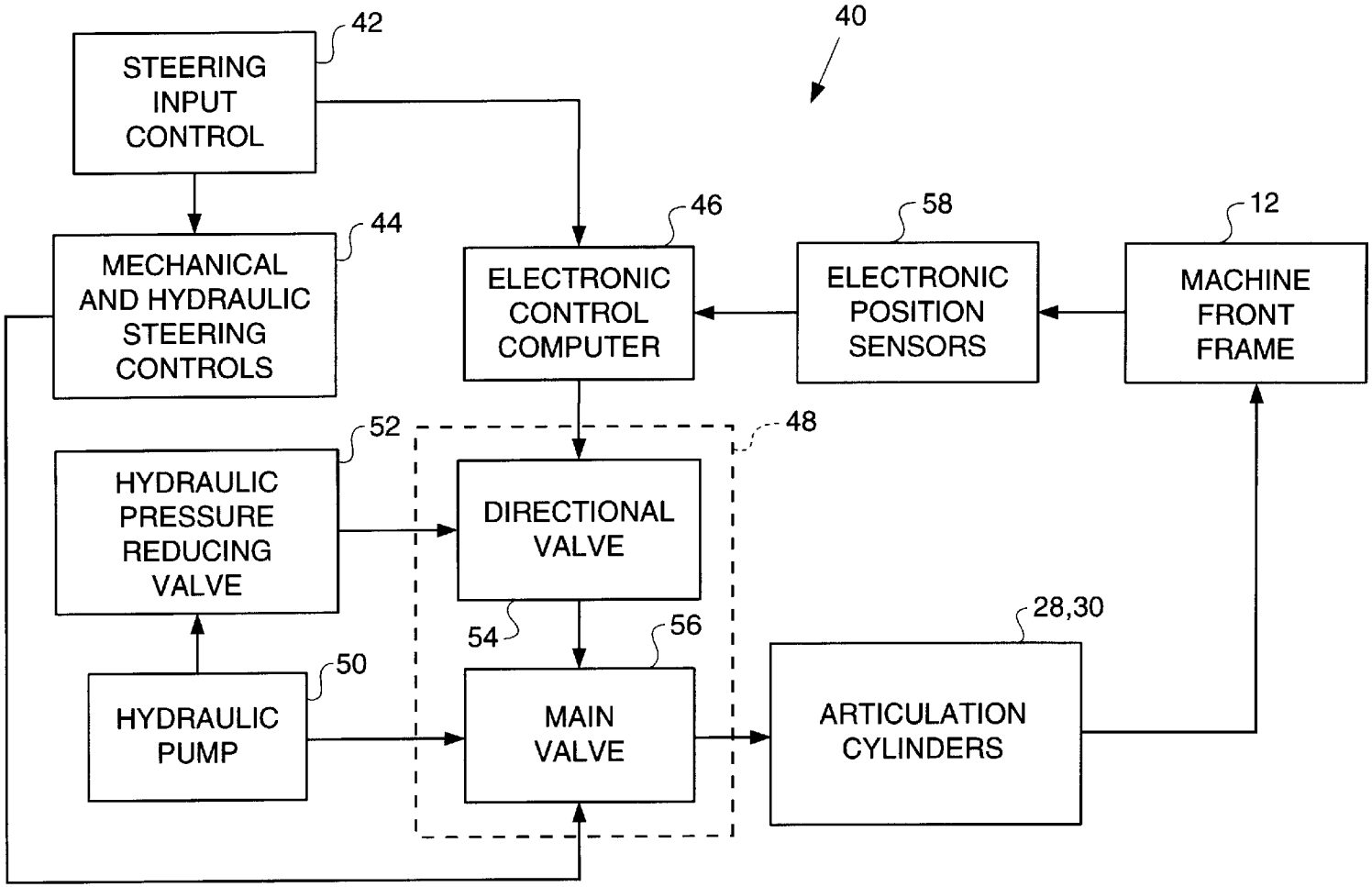
FIG. 2 is a schematic block diagram of an electro-hydraulic steering system for the wheel loader.

FIG. 2 is a schematic block diagram of an electro-hydraulic steering system 40 for the wheel loader 10. The steering system 40 is designed to control the articulation angle $\theta$ of the wheel loader 10. The system 40 includes a steering input control, represented by block 42, which transform the actions of an operator's hands into mechanical movements and electrical input signals. Typically, the steering input control 42 is a steering wheel. The mechanical movements are input into mechanical and hydraulic steering controls, represented by block 44. The electrical input signals carry steering information to an electronic control computer, represented by block 46.

The mechanical and hydraulic steering controls 44 are adjusted by the mechanical movements of the steering input control 42 and combine with a hydraulic pump, described below, to produce high hydraulic pressure.

The control computer 46 receives the electrical input signals produced by the steering input control 42, processes the steering information carried by the input signals, and transmits electrical control signals to an electro-hydraulic unit assembly, represented by block 48. The electro-hydraulic unit assembly 48 includes an electro-hydraulic directional valve, represented by block 54, and a main hydraulic valve, represented by block 56. As will be appreciated by one of ordinary skill in the art, the electro-hydraulic directional value and main hydraulic value are standard readily available values.

The hydraulic portion of the steering system 40 requires both high hydraulic pressure and low pilot pressure. High hydraulic pressure is provided by a hydraulic pump, represented by block 50. The hydraulic pump 50 receives a rotary motion, typically from the engine 22 of the wheel loader 10, and produces high hydraulic pressure. Low pilot pressure is provided by a hydraulic pressure reducing valve, represented by block 52. The hydraulic pressure reducing valve 52 receives high hydraulic pressure from the hydraulic pump 50 and supplies low pilot pressure to the directional valve 54. The reducing value is a standard readily available value.

The directional valve 54 includes an electrical solenoid and a hydraulic valve. The solenoid receives electrical control signals from the electronic control computer 46 and produces a controlled mechanical movement of a core stem of the valve 54. The hydraulic valve receives both the controlled mechanical movement of the core stem of the valve 54 and low pilot pressure from the hydraulic pressure reducing valve 52 and produces controlled pilot hydraulic pressure for the main hydraulic valve 56.

The main hydraulic valve 56 receives both controlled pilot hydraulic pressure from the electro-hydraulic directional valve 54 and high hydraulic pressure from the hydraulic pump 50 and the mechanical and hydraulic steering controls 44, and produces controlled high hydraulic pressure for the articulation cylinders 28 and 30.

The articulation cylinders 28 and 30 receive controlled high hydraulic pressure from the main hydraulic valve 56 and produce a mechanical movement to rotate the front frame 12 of the loader 10. As described above, rotation of the front frame 12 of the loader 10 with respect to the rear frame 14 of the loader 10 establishes the articulation angle $\theta$.

The steering input control 42 and the articulation cylinders 28 and 30 include electronic position sensors, represented by block 58. The electronic position sensors 58 transmit information regarding the position of the steering input control 42 and each articulation cylinder 28 and 30 to the control computer 46. With this position information, the control computer 46 can perform steering performance enhancements, such as snubbing, steering jerk limit control, and electronic steering adjustment.

In order to create snubbing, the control computer 46 can detect when the articulation cylinders 28 and 30 are approaching an end position and transmit electrical control signals to the electro-hydraulic valve 54 to prevent a slam, or an abrupt halt in the movement of the articulation cylinders 28 and 30, as the end position is reached. To limit steering jerk, the control computer 46 can detect an abrupt change in the position of the steering input control 42 and transmit electrical control signals to the electro-hydraulic valve 54 to prevent an abrupt change in the hydraulic pressure delivered to each articulation cylinder 28 and 30 or, in other words, to prevent an abrupt movement of the articulation cylinders 28 and 30. To perform electronic steering adjustment, the control computer 46 can monitor the position of the steering input control 42 and transmit electrical control signals to the electro-hydraulic valve 54 to ensure that the articulation angle $\theta$, as calculated from the position of each articulation cylinder 28 and 30, corresponds with the position of the steering input control 42.

In the event of an electrical power failure, the mechanical and hydraulic steering controls 44 would directly operate the main hydraulic valve 56 to provide limited emergency steering power.

Industrial Applicability

The present invention relates generally to an electro-hydraulic steering system 40 for an articulated vehicle 10 having a front frame 12 and a rear frame 14. A steering input control 42, typically a steering wheel, transmits mechanical steering inputs to the hydraulic steering system 40. A pair of articulation cylinders 28, 30 rotate the front frame 12 with respect to the rear frame 14 in response to hydraulic pressure 48 to steer the vehicle. Position sensors 58 transmit input signals to the controller 46 indicating the position of the steering input control 42 and each of the articulation cylinders 28, 30. An electro-hydraulic valve 48 receives electrical control signals from the controller 46 to control the hydraulic pressure to each articulation cylinder 28, 30. In this manner, the present invention can perform steering performance enhancements, such as snubbing and steering jerk limit control, and electronic steering adjustment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. An electro-hydraulic steering system for an articulated vehicle having a front frame and a rear frame, the system comprising:

a controller;

a hydraulic steering system including a pump for providing hydraulic pressure;

a steering input control for transmitting mechanical steering inputs to said steering system;

at least one articulation cylinder for rotating the front frame with respect to the rear frame in response to hydraulic pressure to steer the vehicle;

position sensors for transmitting input signals to said controller indicating the position of said steering input control and each of said articulation cylinders; and an electro-hydraulic valve for receiving electrical control signals from said controller to control the hydraulic pressure to each articulation cylinder.

2. The steering system as set forth in claim 1, wherein said at least one articulation cylinder has an extended end position and a retracted end position and wherein said controller detects movement of said at least one articulation cylinder approaching one of said end positions and transmits electrical control signals to said electro-hydraulic valve to prevent an abrupt halt in the movement of said at least one articulation cylinder.

3. The steering system as set forth in claim 1, wherein said controller detects an abrupt change in the position of said steering input control and transmits electrical control signals to said electro-hydraulic valve to prevent an abrupt change in the control of hydraulic pressure to said at least one articulation cylinder.

4. The steering system as set forth in claim 1, wherein said controller monitors the position of said steering input control and transmits electrical control signals to said electro-hydraulic valve to match the position of said at least one articulation cylinder with the position of said steering input control.

5. A steering enhancing system for a vehicle, said system comprising:

a operator controlled steering input control for changing the direction of said vehicle;

a steering mechanism responsive to said steering input control for changing the direction of said vehicle, said steering mechanism including at least one hydraulic cylinder operatively connected to said steering input control;

sensors operatively connected to said steering input control and said at least one hydraulic cylinder; and a computer control interconnected to said sensors and said hydraulic cylinder, said sensor sending signals to said computer control from said steering input control and said hydraulic cylinder; said computer control evaluating said signals and controlling said hydraulic cylinder based upon said signals to enhance the steering of said vehicle.

6. The steering enhancement system as set forth in claim 5, wherein at least one hydraulic cylinder extends to fully extended and fully retracted positions and wherein said computer control receives said signals from said sensor as said hydraulic cylinder approaches either of said fully extended or retracted positions, said computer control preventing an abrupt extension to either of said fully extended or fully retracted positions.

7. The steering enhancement system as set forth in claim 5, further including an electro-hydraulic unit interconnected between said computer control and said at least one hydraulic cylinder, said electro-hydraulic unit controlling said at least one hydraulic cylinder in response to said computer control.

8. The steering enhancement system as set forth in claim 6, further including an electro-hydraulic unit interconnected between said computer control and said at least one hydraulic cylinder, said electro-hydraulic unit controlling said at least one hydraulic cylinder in response to said computer control.

9. The steering enhancement system as set forth in claim 5, wherein said sensor detects abrupt changes at said steering input control and signals said computer control to override said steering mechanism and prevent any abrupt change of said at least one hydraulic cylinder.

10. The steering enhancement system as set forth in claim 9, further including an electro-hydraulic unit interconnected between said computer control and said at least one hydraulic cylinder, said electro-hydraulic unit controlling said at least one hydraulic cylinder in response to said computer control.

11. The steering enhancement system as set forth in claim 7, wherein said computer control monitors the position of said steering input control and transmits electrical control signals to said electro-hydraulic unit to match the position of said at least one hydraulic cylinder with the position of said steering input control.

12. An electro-hydraulic steering system for an articulated vehicle having a front frame and a rear frame, the system comprising:

a controller;

a hydraulic steering system including a pump;

a steering input control;

at least one articulation cylinder;

position sensors that transmit input signals to said controller; and an electro-hydraulic valve that receives electrical control signals from said controller and controls pressure to said at least one articulation cylinder.

13. A steering enhancing system for a vehicle, said system comprising:

a operator-controlled steering input control;

a steering mechanism responsive to said steering input control, said steering mechanism including at least one hydraulic cylinder operatively connected to said steering input control;

sensors operatively connected to said steering input control and said at least one hydraulic cylinder; and a computer control interconnected to said sensors and said hydraulic cylinder.

14. A computer-controlled method of electro-hydraulic steering for an articulated vehicle having a front frame and a rear frame, the method comprising the steps of:

providing hydraulic pressure for a hydraulic steering system;

transmitting mechanical steering inputs from a steering input control to said steering system;

rotating said front frame with respect to said rear frame with at least one hydraulic articulation cylinder to steer said vehicle;

transmitting input signals from position sensors to a computer-implemented controller for indicating the position of said steering input control and said at least one hydraulic articulation cylinder;

processing said input signals with said computer-implemented controller; and transmitting electrical control signals from said computer-implemented controller to an electro-hydraulic valve for controlling hydraulic pressure to said at least one hydraulic articulation cylinder.

15. The computer-controlled electro-hydraulic steering method as set forth in claim 14, further comprising the steps of detecting movement of said at least one hydraulic articulation cylinder approaching one of either a fully extended position or a fully retracted position and transmitting electrical control signals to said electro-hydraulic valve to prevent an abrupt halt in the movement of said at least one hydraulic articulation cylinder.

16. The computer-controlled electro-hydraulic steering method as set forth in claim 14, further comprising the steps of detecting an abrupt change in the position of said steering input control and transmitting electrical control signals to said electro-hydraulic valve to prevent an abrupt change in the hydraulic pressure to said at least one hydraulic articulation cylinder.

17. The computer-controlled electro-hydraulic steering method as set forth in claim 14, further comprising the steps of monitoring the position of said steering input control and transmitting electrical control signals to said electro-hydraulic valve to match the position of said at least one hydraulic articulation cylinder with the position of said steering input control.

18. A computer-controlled method for enhancing the steering of a vehicle, comprising the steps of:

inputting steering control for changing the direction of said vehicle;

responding to said input steering control to change direction of said vehicle with a steering mechanism;

sending first signals from sensors responsive to said input steering control;

sending second signals from sensors operatively connected to at least one hydraulic cylinder;

receiving said first and second signals at a computer-implemented controller;

evaluating said first and second signals by said computer-implemented controller; and controlling said at least one hydraulic cylinder based upon said first and second signals to enhance the steering of said vehicle.

19. The computer-controlled enhanced steering method as set forth in claim 18, further comprising the steps of receiving at a computer-implemented controller said second signals from said sensors as said at least one hydraulic cylinder approaches either a fully extended or a fully retracted position and preventing an abrupt extension or retraction of said at least one hydraulic cylinder to either of said fully extended or fully retracted position, respectively.

20. The computer-controlled enhanced steering method as set forth in claim 18, further comprising the step of controlling, in response to said computer-implemented controller, said at least one hydraulic cylinder with an electro-hydraulic unit interconnected between said computer-implemented controller and said at least one hydraulic cylinder.

21. The computer-controlled enhanced steering method as set forth in claim 19, further comprising the step of controlling, in response to said computer-implemented controller, said at least one hydraulic cylinder with an electro-hydraulic unit interconnected between said computer-implemented controller and said at least one hydraulic cylinder.

22. The computer-controlled enhanced steering method as set forth in claim 18, further comprising the steps of detecting abrupt changes of said input steering control and signaling said computer-implemented controller to override said steering mechanism to prevent any abrupt change of said at least one hydraulic cylinder.

23. The computer-controlled enhanced steering method as set forth in claim 22, further comprising the step of controlling, in response to said computer-implemented controller, said at least one hydraulic cylinder with an electro-hydraulic unit interconnected between said computer-implemented controller and said at least one hydraulic cylinder.

24. The computer-controlled enhanced steering method as set forth in claim 20, further comprising the steps of monitoring said input steering control and transmitting electrical control signals to said electro-hydraulic unit to match the position of said at least one hydraulic cylinder with said input steering control.

* * * * *